(12) United States Patent
Katke

(10) Patent No.: US 8,784,220 B1
(45) Date of Patent: Jul. 22, 2014

(54) PLUG-IN CVJ ASSEMBLY

(71) Applicant: NTN USA Corporation, Mt. Prospect, IL (US)

(72) Inventor: Christopher Katke, Redford, MI (US)

(73) Assignee: NTN Bearing Coporation of America, Mt. Prospect, IL (US)

( * ) Notice: Subject to any disclaimer, the term of this patent is extended or adjusted under 35 U.S.C. 154(b) by 0 days.

(21) Appl. No.: 13/799,950

(22) Filed: Mar. 13, 2013

(51) Int. Cl.
*F16D 3/84* (2006.01)

(52) U.S. Cl.
USPC .......................................... 464/173; 464/906

(58) Field of Classification Search
CPC ................................. F16D 3/845; F16J 3/042
USPC ........... 464/173–175, 904–906; 277/634–637
See application file for complete search history.

(56) References Cited

U.S. PATENT DOCUMENTS

| | | | |
|---|---|---|---|
| 4,747,805 A * | 5/1988 | Welschof et al. ............. | 464/175 |
| 4,946,303 A * | 8/1990 | Sawicki ........................ | 464/906 |
| 5,522,771 A * | 6/1996 | Poulin .......................... | 464/905 |
| 7,377,854 B2 | 5/2008 | Wormsbaecher | |
| 7,470,198 B2 | 12/2008 | Cermak | |
| 7,553,238 B2 | 6/2009 | Wormsbaecher | |
| 7,677,981 B2 | 3/2010 | Zierz et al. | |
| 7,677,984 B2 | 3/2010 | Hahn et al. | |
| 7,691,001 B2 | 4/2010 | Lutz et al. | |
| 7,712,994 B2 | 5/2010 | Cermak | |
| 7,867,099 B2 | 1/2011 | Szentmihalyi et al. | |
| 8,025,454 B2 | 9/2011 | Cermak | |

OTHER PUBLICATIONS

Universal Joint and Driveshaft Design Manual, AE-7, Society of Automotive Engineers, Inc., Warrendale, PA, pp. 145-150, TJ1079. S62 1979.*

* cited by examiner

*Primary Examiner* — Gregory Binda
(74) *Attorney, Agent, or Firm* — Brinks Gilson & Lione

(57) ABSTRACT

A powertrain assembly for use in a motor vehicle powertrain system having an output shaft forming a cylindrical outer surface, a splined end, and a radial shoulder, and a CVJ assembly having an inner race, and outer race. Ball elements are provided between the inner and outer races. A seal assembly is provided having a boot with an outer lip affixed to the CVJ outer race and an inner lip forming first and second radial faces and an inside cylindrical surface. Axial insertion of the output shaft splined end into the CVJ inner race splined bore causes the boot assembly inner lip to be expanded and frictionally engage with the output shaft cylindrical outer surface and wherein the boot inner lip first and second radial faces are clamped between the inner race radial surface and the shaft radial shoulder.

5 Claims, 3 Drawing Sheets

PLUG-IN CVJ ASSEMBLY

FIELD OF THE INVENTION

This invention relates to a motor vehicle powertrain component, and particularly to an assembly which provides attachment between an output shaft and a constant velocity joint (CVJ) component.

BACKGROUND OF THE INVENTION

Motor vehicle powertrain systems typically incorporate a number of components for transferring mechanical power from an internal combustion engine prime mover and its associated transmission to vehicle drive wheels. These elements, particularly in applications where rear axle drive wheels are driven via a front mounted engine, typically include a propeller shaft running longitudinally underneath the floor pan of the vehicle from the engine and transmission assembly at the front of the vehicle to a rear axle differential. As is typical for such systems, the propeller shaft includes one or more flexible joints such as conventional so-called universal joints (or U-joints), or more sophisticated articulating connections known as constant velocity joints (CVJ). A CVJ provides a smooth rotational output when an angle is formed between its input and output shaft members which contributes to reducing noise and vibration issues. This is distinguishable from conventional U-joints which induce powertrain vibrations inherent in their operation of off-axis conditions.

During the assembly of a motor vehicle it is desirable to provide fast, straightforward assembly processes which inherently enhance quality and reliability. For all components for motor vehicle applications, low-cost is a primary design criterian.

SUMMARY OF THE INVENTION

The powertrain assembly in accordance with the present invention provides a simple and accurate assembly of components which provides reliability and cost benefits over existing designs of such systems. These systems in accordance with this invention are described in the following description and appended drawing figures.

DETAILED DESCRIPTION OF THE INVENTION

Figure 1:
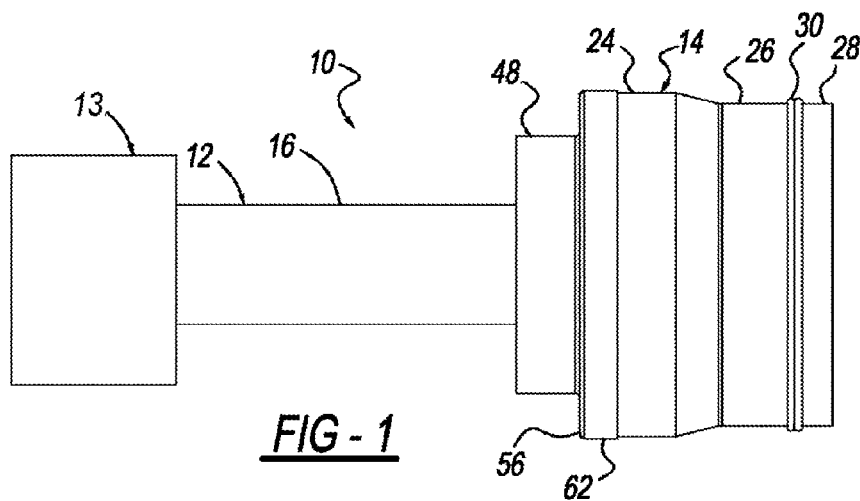
FIG. 1 is a side pictorial view of the assembly in accordance with this invention.
Figure 2:
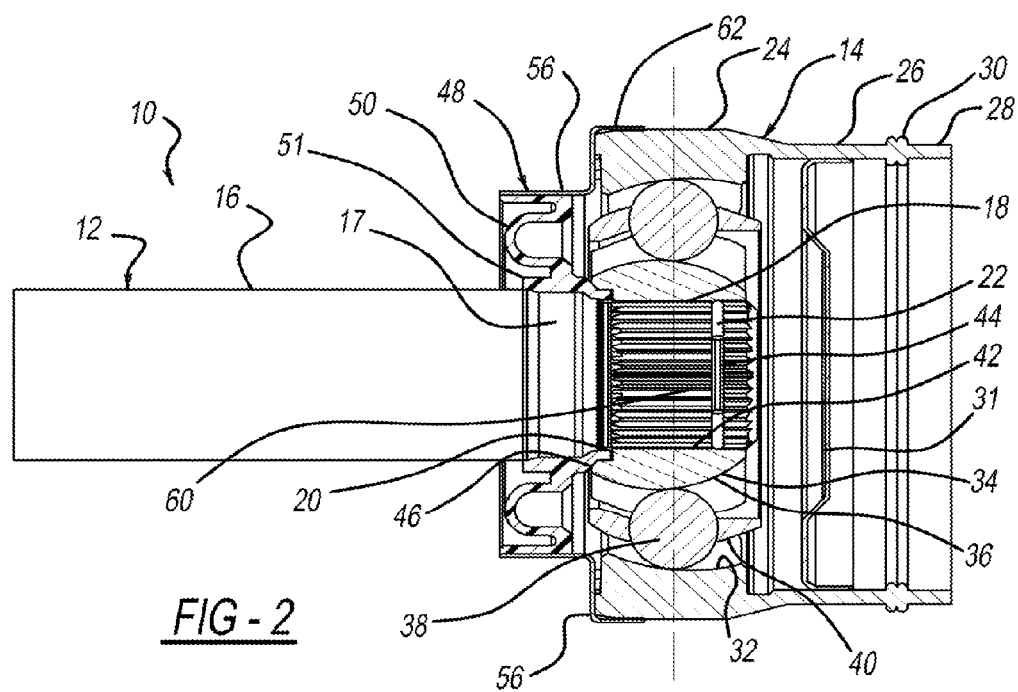
FIG. 2 is a longitudinal cross-sectional view through the assembly shown in FIG. 1.
Figure 3:
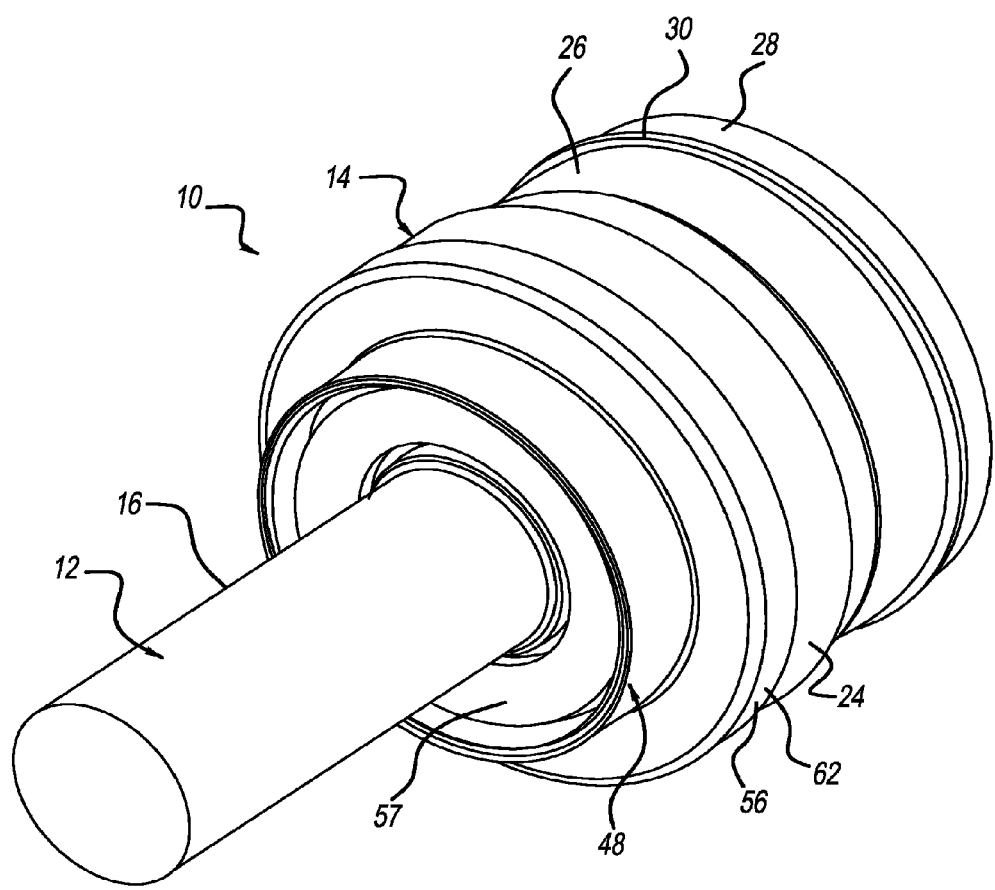
FIG. 3 is a perspective view of the assembly in accordance with this invention.

FIGS. 1, 2, and 3 illustrate powertrain assembly 10 in accordance with the present invention. Assembly 10 principally comprises output shaft 12 and CVJ assembly 14. With particular reference to FIG. 2 output shaft 12 is illustrated which may be an output shaft from a powertrain transmission, power takeoff unit (PTU), or transfer case generally designated in FIG. 1 with numeral 13. Output shaft 12 forms shaft portion 16, and radial face 20 forms a transition to reduced diameter cylindrical section 17, and a further reduced diameter splined end 18. In an alternative configuration, shaft portion 16 and cylindrical section 17 may have the same diameter, or section 17 have a larger diameter, with radial face 20 formed by a localized rib or bead. Circumferential groove 22 is formed within splined end 18.

CVJ assembly 14 includes outer race 24 which has an extending tubular section 26. In one exemplary embodiment of assembly 10, tubular section 26 is friction welded to hollow propeller shaft tube 28. FIG. 2 illustrates weld bead 30 formed in the welding process. Other means of fusing tubular section 26 to tube 28 may be employed, such as magnetic impeller arc butt welding (MIAB), and other techniques. Sheet metal cap 31 is pressed into the cavity formed by CVJ tubular section 26 and provides the sealing for CVJ 14.

CVJ outer race 24 forms an annular bell shaped grooved cavity surface 32. CVJ inner race 34 forms an annular crowned grooved surface 36. Ball elements 38 fit within the grooves formed by the outer race 24 and inner race 34. The interaction between the race surfaces and ball elements 38 provides the constant velocity properties of CVJ assembly 14. Ball element keeper 40 provides stability for positioning ball elements 38.

Inner race 34 forms splined bore 42 which is sized to receive output shaft splined end 18. Splined bore 42 also forms annular groove 44 which interacts with output shaft groove 22 as will be explained below. Inner race 34 further forms radial shoulder 46.

Figure 4:
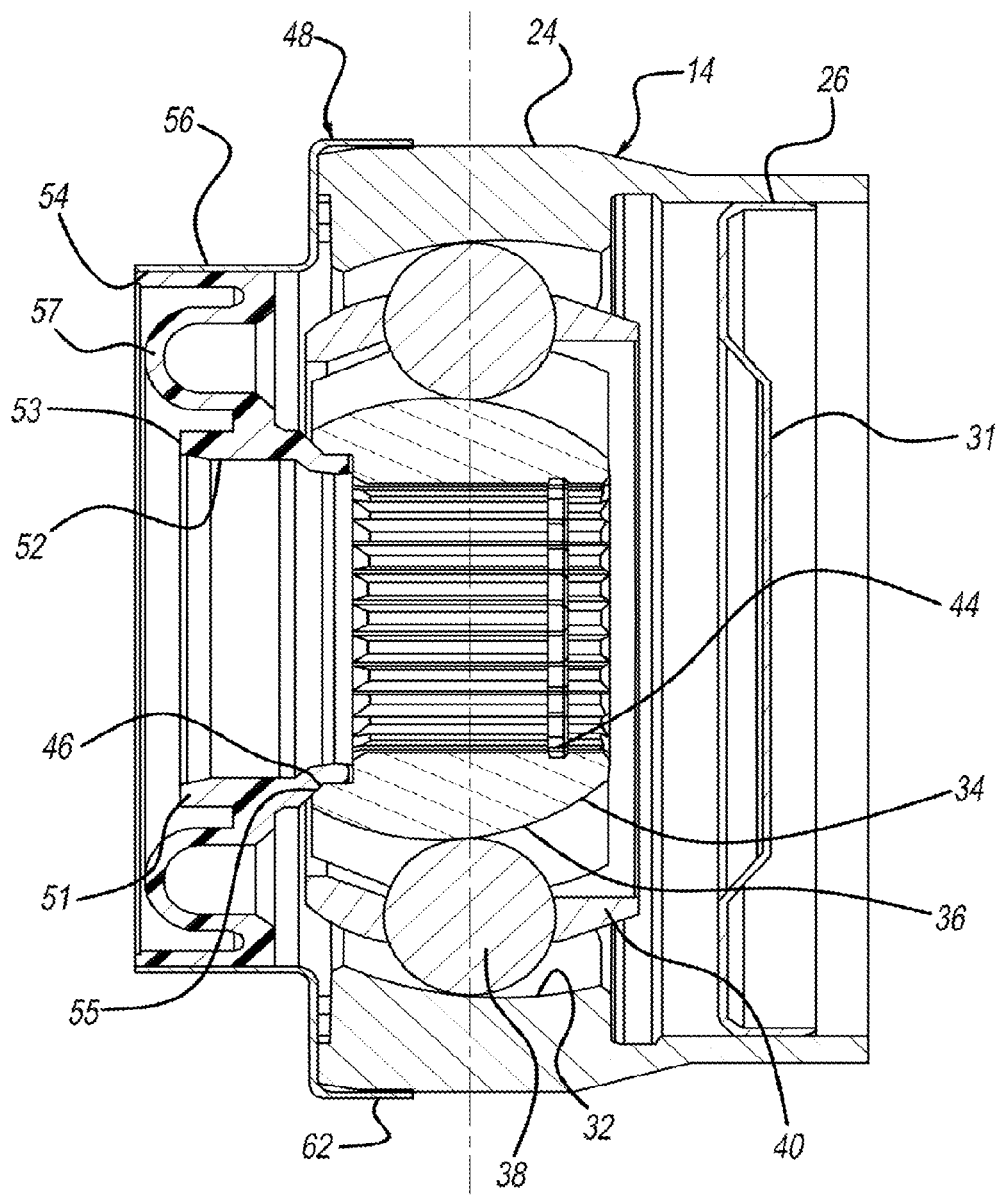
FIG. 4 is a cross-sectional view similar to FIG. 2 with the exception that the output shaft is not installed.

Seal assembly 48 is provided for sealing CVJ assembly 14 against contamination by water and road debris. Seal assembly 48 includes elastomeric boot 50 having inner lip 51 forming an inside cylindrical surface 52, and radial faces 53 and 55. Bellows section 57 is between the inner and outer lips 51 and 54 and seals the CVJ and accommodates angle changes between shaft 12 and outer race 24. The radially outer lip 54 of boot 50 is bonded or otherwise affixed to seal ring 56, preferably formed of sheet metal. Seal ring 56 includes outer flange 62 sized to enable it to be pressfit onto CVJ outer race 24, as shown in FIGS. 2 and 4.

In the assembly process of powertrain assembly 10, output shaft 12 is initially separate from CVJ assembly 14. A circlip 60 is installed onto output shaft splined end groove 22 (or initially installed into inner race groove 44). Splined end 18 is aligned with inner race splined bore 42 and inserted or "plugged in" to CVJ 14 (moving end 18 to the right as the components are illustrated in FIG. 2). As output shaft 16 is plugged in, boot inner lip 51 is forced to expand, as inside cylindrical surface 52 is slid onto shaft section 17. Radial face 53 of seal lip 51 engages or "bottoms out" against shaft inner race radial shoulder 20. Splined end 18 is advanced until there is a registration between circlip grooves 22 and 44, at which point the circlip 60 expands to lock the parts into their assembled position. In the installed position, inner lip 51 radial face 55 contacts inner race shoulder 46 and the inner lip is compressed between shaft shoulder 20 and inner race shoulder 46. Thus, seal assembly 48 seals directly against output shaft 12. The "plugging in" motion between output shaft 12 and CVJ assembly 14 positions, without additional action, seals boot 50 at its desired position, which is caused by its expansion and contact with inner race 34. This design is inherently reliable for assembly, since special steps are not required to properly orient and position seal assembly 48 into its desired position.

While the above description constitutes the preferred embodiment of the present invention, it will be appreciated that the invention is susceptible to modification, variation and change without departing from the proper scope and fair meaning of the accompanying claims.

The invention claimed is:

1. A powertrain assembly for use in a motor vehicle powertrain system, comprising:
   an output shaft forming a cylindrical shaft surface, a radial shoulder, and a splined end,
   a CVJ assembly having an inner race, and outer race, and ball elements therebetween, the inner race forming an inside splined bore and a radial face surface, and
   a seal assembly having a boot with an outer lip affixed to the CVJ outer race and an inner lip forming first and second radial faces and an inside cylindrical surface, and wherein axial insertion of the output shaft splined end into the CVJ inner race splined bore causes boot inner lip to be expanded and frictionally engaged with the output shaft cylindrical shaft surface and wherein the boot inner lip first and second radial faces are clamped between the inner race radial surface and the shaft radial shoulder, wherein a portion of the boot inner lip is arranged radially between the output shaft and the CVJ inner race.

2. The powertrain assembly in accordance with claim 1 further comprising the seal assembly having a seal ring and the outer lip bonded or otherwise affixed to the seal ring and the seal ring press fit onto the CVJ assembly outer race.

3. The powertrain assembly in accordance with claim 1 further comprising the output shaft and the CVJ inner race forming respective annular grooves and a circlip fitting within the grooves when the assembly is in an assembled condition.

4. The powertrain assembly in accordance with claim 1 further comprising the CVJ assembly outer race forming a tubular section joined to a propeller shaft tube by welding.

5. The powertrain assembly in accordance with claim 1 further comprising the assembly output shaft coupled with a transmission or a transfer case.

* * * * *